Figure 1:
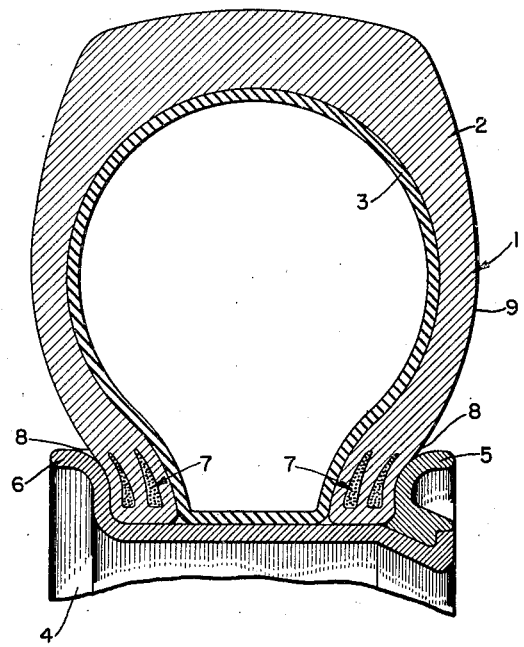

Oct. 11, 1949.  E. W. GLEN  2,484,620
FLEXIBLE PROTECTIVE CUSHION FOR TIRE CHAFER AREA
Filed May 28, 1946  2 Sheets-Sheet 1

*INVENTOR.*
EARL W. GLEN
BY
ATTORNEY

Oct. 11, 1949.  E. W. GLEN  2,484,620
FLEXIBLE PROTECTIVE CUSHION FOR TIRE CHAFER AREA
Filed May 28, 1946  2 Sheets-Sheet 2

INVENTOR.
EARL W. GLEN
BY
ATTORNEY

Patented Oct. 11, 1949

2,484,620

UNITED STATES PATENT OFFICE 2,484,620

FLEXIBLE PROTECTIVE CUSHION FOR TIRE CHAFER AREA

Earl W. Glen, Akron, Ohio, assignor to Wingfoot Corporation, Akron, Ohio, a corporation of Delaware Application May 28, 1946, Serial No. 672,830

2 Claims. (Cl. 152—362)

The present invention relates to an improved pneumatic tire construction which effectively prevents damage to the tire resulting from chafing and rim cutting at the base of the tire sidewall adjacent the beads when the tire is in use. More particularly, the invention relates to a flexible cushion formed as an integral part of a pneumatic tire and providing the desired protection against damage resulting from the chafing action of the rim on which the tire is mounted.

It is an object of the present invention to afford a means for preventing damage to the bead area of pneumatic tires throughout the original tread life of the tire.

It is also an object of the present invention to afford a means for preventing damage to the bead area of pneumatic tires throughout the life of successive treads obtained by recapping or retreading.

It is a further object of the present invention to provide a suitable protective cushion for a pneumatic tire at the bead area thereof to protect it against the chafing action of the rim during the operation of the tire.

It is a still further object of the present invention to provide an effective means of increasing the trouble-free operation and life of pneumatic tires particularly multiple beaded truck-type and off-the-road tires.

It is also an object of the present invention to provide a highly flexible cushioning medium in the bead area of a tire by the application of excess rubber to the tire as it is molded to insure a substantial amount of abrasive-resistant coating material at the lower portion of the sidewall and adjacent the bead area.

A still further object of the present invention is to provide a series of flexible ribs or the like of generally annular form projecting outwardly from the lower sidewall portion of the tire adjacent the bead area formed in the molding operation of abrasive-resistant compound which can be accomplished wholly without special equipment or further operating steps in the manufacture of tires.

One of the mishaps frequently encountered in the operation of ordinary pneumatic tire equipment is the damage caused to the lower portions of the sidewall areas adjacent the beads by abrasion created between these surfaces and the retaining abutments or flanges on the rim on which the tire is mounted. This abrasion and rim cutting weakens the fabric structure of the tire and seriously affects its operating life. The damage resulting is much more pronounced in off-the-road and heavy-duty truck-type tires, particularly those embodying heavy and multiple beads.

The major responsibility for this damage has been traced to an insufficient protective coating for the outer layers of fabric in the tire at the points where the flange portions of the rim engage the bead portions of the tire. In the course of the vulcanization step in the manufacture of a pneumatic tire, the gum rubber of the chafer strip and other fabric layers, due to the heat and pressure of the mold, tends to flow away from the flange-contacting area adjacent the bead portions of the tire and thus leaves only a relatively thin skin coating of rubber over the fabric. This skin coat may be quite easily cut through or worn off by the abrasive action of the rim flanges during the normal operation of the tire.

The inventive concept disclosed herein is particularly advantageously adapted to be employed in tire building operations employing molds which are retained in continuous high temperatures such as is the case with watch-case or individual vulcanizer curing equipment. It is a well-known fact in the rubber industry that the hot mold rings and molds used in this type of cure make it extremely difficult to produce a thick coating of abrasive-resistant compound on the outside of the chafer strip of fabric which surrounds the beads of the tire. The present invention contemplates the production of means providing the equivalent of the desired protective coating on the outside of the chafer strip in these hot type mold cures.

The heavy loads and high speeds of present-day vehicles tend to promote the amount of abrasion and cutting action resulting to the tire. It is the purpose of the present invention to provide a means of reducing the effect of such action and its tendency to shorten the life of the tire. The desired end is achieved by locating a plurality of flexible ribs of abrasive-resistant rubber compound in the area adjacent the beads of the tire where the flange portions of the rim contact. These flexible ribs operate to create in the flange-contacting area a rubber cushion which effectively prevents abrasion and other like damage to the fabric.

Other objects and advantages of the present invention will become apparent as the description of the accompanying drawings illustrating a pneumatic tire embodying the principles of the invention proceeds.

Figures 3, 4:
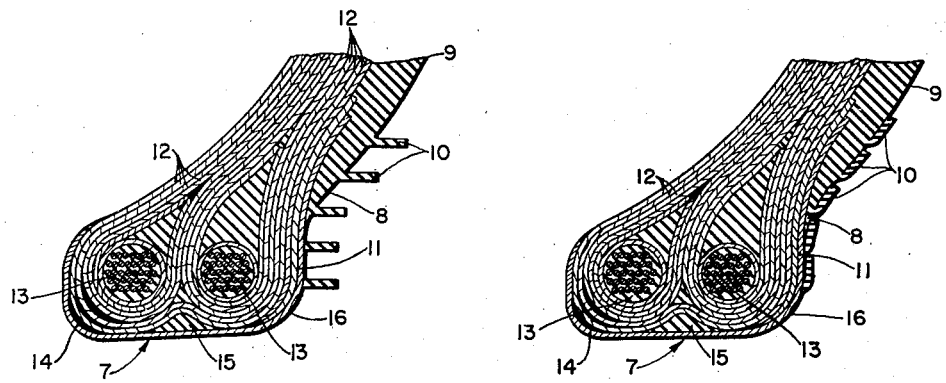
Figure 2:
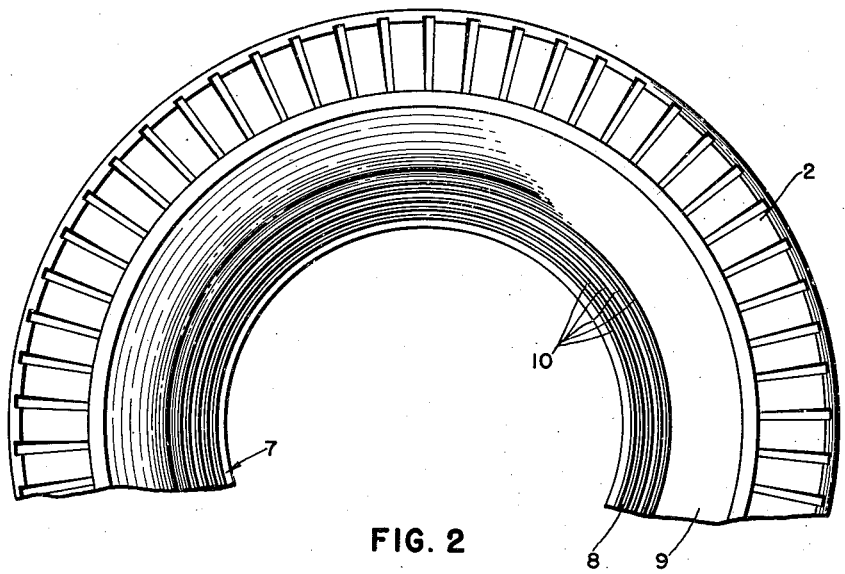
Figure 5:
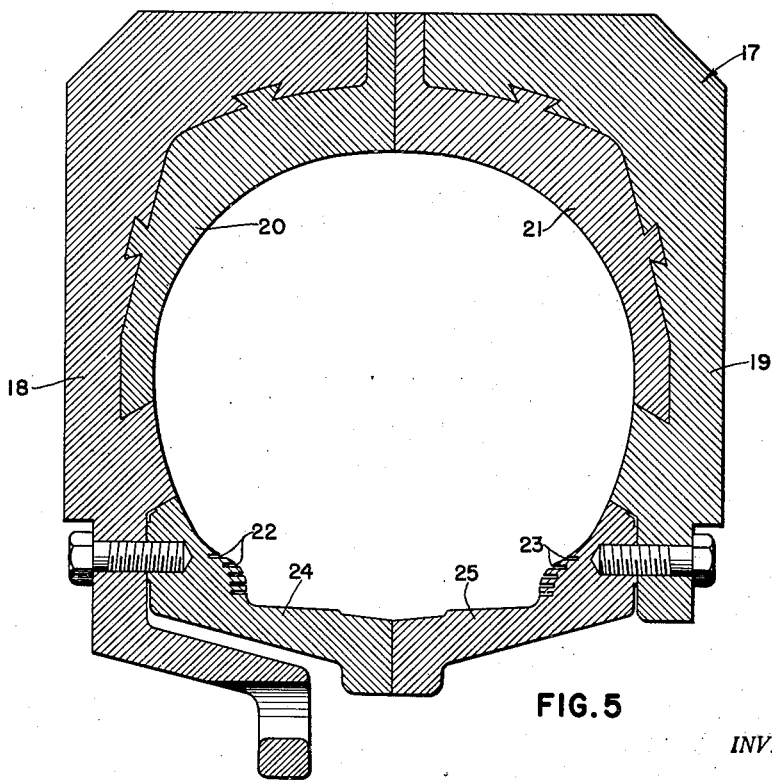

Fig. 1 of the drawings represents a partial cross-section of a tire assembly embodying a tire and tube mounted upon a rim. Fig. 2 is an elevation of a tire with part broken away illustrating the manner of employment of the flexible abrasion-resisting elements of the present invention. Fig. 3 represents a greatly enlarged segmental cross-section of the bead portion of a pneumatic tire showing the abrasion-resisting elements of the invention. Fig. 4 corresponds generally to Fig. 3, but illustrates the manner in which the abrasion-resisting elements serve to protect the tire beads. Fig. 5 is a cross-section of a typical vulcanizing mold embodying a means for forming the abrasion-resisting elements of the invention.

In Fig. 1 of the drawings the reference numeral 1 indicates generally a pneumatic tire assembly embodying a tire 2 having an inner tube 3 mounted upon a rim 4. The tire 2 is held in place upon the rim as by means of cooperating flanged abutments including a locking ring 5 which, together with the integrally formed flange portion 6 of the rim, serves to provide restraining means for the bead portions 7 when the tire is inflated. The locking ring 5 and the integral flange 6 of the rim 4, when the tire assembly is complete, contact the flange portions 7 in the area indicated by the reference numeral 8.

As previously explained, the flanged abutments 5 and 6 of the rim 4 tend to create a serious abrasive action in the flange-contacting area 8 adjacent the bead portions 7 of the tire 2 especially when the tire assembly 1 is under load in normal operations. The flange-contacting area 8 extends from the lowermost extremity of the bead portion 7 of the tire 2 to a point slightly above the uppermost extremity of the flanged abutments created by the locking ring 5 and the flange portion 6 of the rim 4 where it merges with the sidewall portion 9 of the tire. It is in this area that, if sufficient abrasive resistant compound is not present on the outer surface of the fabric forming the carcass of the tire, serious damage results.

As will be noted from Fig. 2 of the drawings, the present invention contemplates the employment of a plurality of spaced annular ribs 10 of flexible abrasive-resistant rubber compound integrally molded in place upon the outer surface of the tire 2 adjacent the bead portion 7 of the tire 2. The several ribs 10 are spaced over the extent of the flange-contacting area indicated by the reference numeral 8. The ribs 10 are advantageously formed as continuous ribs and arranged concentrically with respect to the beads in the bead portion 7 of the tire 2.

Referring to Fig. 3, it will be noted that the flexible ribs 10 are so formed that they extend substantially normal to the surface of the tire 2 throughout the area 8 of the bead portion 7. In the fabrication of the pneumatic tire 2, a chafer strip 11 is applied to the exterior of the several plies 12 of fabric which extend about the bead portion 7 of the tire and about the annular beads 13. The beads 13 are arranged side by side in the bead portion 7 of the tire 2 and are securely held in place by the several superposed plies of fabric 12. When the tire 2 is vulcanized according to the customary procedure, the rubber in which the cords forming the individual plies are embedded tends to flow into the areas indicated by the reference numerals 14, 15, and 16, leaving only a relatively thin surface coating of the rubber on the outer surface of the chafer strip 11.

The several spaced annular bands or ribs 10 serve to replace the lack of rubber coating over the surface of the tire in the flange-contacting area 8 which protects the chafer strip 11. The protection afforded by the annular ribs 10 is indicated in Fig. 4 of the drawings which illustrates the ribs 10 in folded-over relation throughout the area 8 of the tire 2, thereby effectively covering the outer surface of the chafer strip 11. This rubber compound in the form of the annular ribs 10 thus insures against the possibility of damage to the chafer strip 11 when the tire is assembled on the rim 4 with the bead portions 7 thereof in contact with the locking ring 5 and the flange 6 thereof.

The fabrication of the annular ribs 10 as an integral part of the rubber compound forming part of the tire 2 is achieved by the use of a standard form of mold structure 17 as illustrated in Fig. 5 of the drawings with only relatively simple revisions. The mold structure 17 is made up of two cooperating rings 18 and 19 having insert castings 20 and 21 fixed therein for forming a tread design upon the tread portion of the finished tire. A plurality of slots 22 and 23 are cut circumferentially of the parts 24 and 25 of each mold ring 18 and 19, respectively. The mold parts 24 and 25 embodying the several slots 22 and 23 supply means for forming the plurality of spaced annular ribs 10 on each of the bead portions of the completed tire in the course of the vulcanization steps.

In the manufacture of the tire it is necessary to provide an extra heavy application of gum rubber to the chafer strips in order to afford a sufficient supply of rubber to fill all of the slots 22 and 23 in the mold parts 24 and 25 of the mold structure 17. If an insufficient supply of rubber compound is available from the stock in the built-up tire carcass, an extra strip of compound of desired character may be readily applied in the green or uncured state to the outer surface of the area 8 of the bead portion 7 when the tire is being built and before the tire is inserted in the mold 17.

It is essential in any such construction as that contemplated by the present invention the segments of rubber or abrasive-resistant compound be flexible enough to be folded over or turned against the outer surface of the chafer strip 11 of the tire 2 when it is in place upon the rim 4 and fully inflated. It is also essential that the volume of the cavities so produced be not greater than enough to accommodate the chafer uncured coating to prevent undesirable flow of fabric to these cavities or enough to materially affect the fit of the tire on the rim.

Numerous tests under various conditions of load and speed have demonstrated that the damage resulting from abrasive action or cutting of the rim flanges has been reduced to a minimum. The flexible annular ribs 10 form a continuous protective coating extending over the entire flange-contacting area 8 of the bead portion 7 of the tire when the tire is installed upon the rim 4 and the locking ring 5 is put in place to jam the bead portions 7 against the opposite flange 6. On inflation of the tire these ribs 10 are positioned as shown in Fig. 4 of the drawings completely covering the flange-contacting areas 8 of both bead portions 7, thereby creating an effective protective cushion for the area 8 in the operation of the tire.

It is to be understood that the phrase "rubber and the like" wherever employed herein is intended to cover the use of rubber, whether natural or synthetic, as well as other suitable forms of moldable plastic material which possesses the desired degree of flexibility when formed in accordance with the teachings of the present invention.

While in accordance with the patent statutes one best known embodiment of the invention has been illustrated and described in detail, it is to be particularly understood that the invention is not limited thereto or thereby, but that the inventive scope is defined in the appended claims.

I claim:

1. An open-beaded type pneumatic tire provided with a cushion adjacent the bead area of the tire for the prevention of rim chafing when the tire is mounted on a rim, said cushion comprising a plurality of thin flexible projecting ribs arranged in spaced, generally parallel relation to each other concentrically of the beads of the tire, the length of projection of each of the several ribs being substantially equal to the spacing therebetween whereby a substantially continuous cushion is provided for the bead area of the tire when the ribs are folded over on contact with the rim.

2. An open-beaded type pneumatic tire provided with a cushion adjacent the bead area of the tire for preventing chafing caused by contact with the flange portions of the rim upon which the tire is mounted, said cushion comprising a plurality of thin flexible embossed portions projecting outwardly substantially normal to the bead portions of the tire and being arranged in spaced generally parallel relation to each other concentrically of the beads of the tire, the length of projection of the several embossed portions being substantially equal to the spacing between adjacent embossed portions whereby a substantially continuous cushion for the bead area of the tire is presented to the rim when the embossed portions are folded over on contact with the flange portions of the rim.

EARL W. GLEN.

REFERENCES CITED

The following references are of record in the file of this patent:

UNITED STATES PATENTS

| Number | Name | Date |
| --- | --- | --- |
| 575,783 | Quimby | Jan. 26, 1897 |
| 893,655 | Rempes | July 21, 1908 |
| 1,462,517 | Marquette | July 24, 1923 |
| 1,816,293 | Oberhuber | July 28, 1931 |
| 1,842,315 | Conigrave | Jan. 19, 1932 |
| 1,915,963 | Wait | June 27, 1933 |
| 1,966,580 | Bull | July 17, 1934 |

FOREIGN PATENTS

| Number | Country | Date |
| --- | --- | --- |
| 78,362 | Norway | 1930 |